(12) United States Patent
Lauer

(10) Patent No.: US 7,545,548 B2
(45) Date of Patent: Jun. 9, 2009

(54) MODIFIABLE ASSEMBLY OF MICROSCOPIC APERTURES

(76) Inventor: Vincent Lauer, 1 villa de Beauté, Nogent sur Marne (FR) 94130

( * ) Notice: Subject to any disclaimer, the term of this patent is extended or adjusted under 35 U.S.C. 154(b) by 0 days.

(21) Appl. No.: 11/409,009

(22) Filed: Apr. 24, 2006

(65) Prior Publication Data

US 2006/0187516 A1 Aug. 24, 2006

Related U.S. Application Data

(63) Continuation of application No. 10/474,269, filed as application No. PCT/FR02/01222 on Apr. 9, 2002, now Pat. No. 7,088,487.

(30) Foreign Application Priority Data

Apr. 10, 2001 (FR) .................................. 01 04841
Sep. 18, 2001 (WO) ...................... PCT/FR01/02890
Jan. 22, 2002 (FR) .................................. 02 00780

(51) Int. Cl.
*G02B 26/02* (2006.01)
(52) U.S. Cl. ........................ 359/233; 359/227; 359/368

(58) Field of Classification Search ................... 359/233
See application file for complete search history.

(56) References Cited

U.S. PATENT DOCUMENTS

| 4,812,913 | A |   | 3/1989 | Knop |   |
| 4,880,294 | A |   | 11/1989 | Brakenhoff |   |
| 5,162,941 | A | * | 11/1992 | Favro et al. | 359/386 |
| 5,400,170 | A |   | 3/1995 | Hanada |   |
| 5,969,846 | A | * | 10/1999 | Kishi | 359/227 |
| 6,002,509 | A |   | 12/1999 | Van Resandt |   |
| 7,088,487 | B2 | * | 8/2006 | Lauer | 359/233 |

FOREIGN PATENT DOCUMENTS

| DE | 198 07 716 A1 | 9/1999 |
| DE | 199 29 958 C1 | 11/2000 |

* cited by examiner

*Primary Examiner*—James Phan

(57) ABSTRACT

The invention concerns a modifiable assembly of microscopic apertures comprising several plates (100, 110) that are opaque except on transparent parts (101, 114, 115), capable of moving relative to one another, to modify the size of resulting pinholes. The invention is applicable for microscopic apertures for confocal microscopy.

11 Claims, 19 Drawing Sheets

MODIFIABLE ASSEMBLY OF MICROSCOPIC APERTURES

RELATED APPLICATIONS

This application is a continuation of U.S. application Ser. No. 10/474,269 filed Jul. 21, 2004, now U.S. Pat. No. 7,088, 487, which was the National Stage of International Application No PCT/FR02/01222 filed Apr. 9, 2002. The entire contents of both these applications is expressly incorporated herewith by reference thereto.

FIELD OF THE INVENTION

The invention concerns a microscopic hole or a set of microscopic holes (pinholes), the number of these holes and/ or their size being able to be modified easily. Such a set of pinholes is intended to be used for various applications in optics, in particular in confocal microscopy.

BACKGROUND

In confocal microscopy use is usually made of two types of pinhole:
  holes of fixed size: to modify the size of a hole, it is necessary to replace it with another. Typically several pinholes can be mounted on a wheel having a position corresponding to the use of each of these holes. The movement of the wheel must be very precise.
  holes of variable size: functioning on the principle of the iris diaphragm, they require at least three blades which form a hole by crossing one another and are expensive because of the relative complexity of the mechanism.

Conventionally, confocal microscopy systems require the use of a single pinhole. For example, the first embodiment of French patent application number 0103860 of 22 Mar. 2001, as well as the microscope described in FIG. 3 of the U.S. Pat. No. 5,978,095 or the microscope described in the U.S. patent application No. 5,162,941.

Other confocal microscopy system require the use of an array of pinholes. For example, the microscopes described by FIG. 1 of U.S. Pat. No. 5,239,178 or FIG. 3 in the U.S. Pat. No. 5,978,095, or the Nipkow disk systems.

In certain embodiments of a microscope such as the one described in French patent number 0103860 of 22 Mar. 2001, an array of pinholes must be positioned with great precision, which is difficult using a simple technique consisting of exchanging the whole of the array. When "single" pinholes are simply exchanged, as on certain single-point confocal microscopes, their precise positioning is also difficult. In addition, the system for exchanging arrays of pinholes are necessarily bulky, since their size is the sum of the sizes of each array able to be exchanged.

In the case of microscopes using an array of pinholes, the size and density of the holes cannot usually be modified. However, this modification is desirable in order to adapt the size of the holes to the wavelength being studied. U.S. Pat. No. 6,002,509 affords a solution to this problem in the case of a Nipkow disk microscope. However, this solution requires the replacement of the array of holes with an array of reflective points. When the technique used consists of using reflective points produced by a multilayer treatment, each wavelength corresponds to a given size and density of the reflective points. It is then not possible to modify the size or density of the holes of the hole with a given wavelength, and the number of different sizes of holes is limited by the performance of the multilayer treatment. When the technique used consists of introducing several concentric rings on the Nipkow disk, a movement of the disk, which is not very practical, is necessary, and the size of the disk rapidly becomes excessive. The technique is difficult to adapt to systems using a fixed array of pinholes.

SUMMARY OF THE INVENTION

The object of the invention is a a plurality of pinholes of variable size, the changes to which are obtained by a simplified method which is precise and inexpensive. In particular, one object of the invention is to produce pinholes which can be modified without problems in positioning and which are of reduced bulk. "Holes" means holes in the optical sense of the term, that is to say small areas through which light can pass, not necessarily void. A "hole" can for example be an interruption in an opaque layer deposited on glass.

To this end, the object of the invention is a modifiable array comprising a plurality of microscopic apertures and adapted to filter a light beam in a confocal microscope,
  comprising a plurality of plates each of which comprises a plurality of intermediate apertures,
  wherein each microscopic aperture results from the superimposition of intermediate apertures in each of said plates,
  wherein each of said intermediate apertures contributes to the formation of at most one microscopic aperture,
  at least one of said plate being adapted to move, to switch from a first configuration to a second configuration,
  wherein the size of the microscopic apertures in said second configuration differs from the size of the microscopic apertures in said first configuration, and
  wherein each microscopic aperture is made up of the superimposition of the same intermediate apertures in the second configuration as in the first configuration.

An iris diaphragm also comprises plates sliding with respect to each other. The invention is distinguished in this by the fact that these plates carry pinholes and by the fact that one of the plates carries at least two pinholes. This particular arrangement simplifies the design of the system and makes it possible to produce arrays of modifiable pinholes, whilst iris diaphragms are designed only for a single modifiable pinhole.

A modifiable set of pinholes can also be obtained by a system physically exchanging two sets of pinholes produced on different plates. This solution is used in certain single-point confocal microscopes. The present invention is distinguished from this simple technical solution by the use of several superimposed plates, which makes it possible to modify the array of pinholes by means of movements which are also microscopic, rather than macroscopic as is the case in the state of the art. This simplifies the positioning problems.

Various techniques for producing plates can be employed. For example, and according to one characteristic of the invention, two of said plates can be transparent windows on which said pinholes are produced by the deposition of an opaque layer by a lithographic method. The opaque layers on these two plates can then be turned towards each other, so that the space separating them is as small as possible. The advantage of this technique is that the window have good rigidity (deform little).

According to one characteristic of the invention, at least one of the plates is a fine opaque sheet in which said pinholes are obtained by piercing. This solution is necessary when more than two plates are used. This is because, if only glass plates are used, their thickness does not make it possible to produce an array of holes correctly.

According to one characteristic of the invention, the plates consisting of fine opaque sheets are placed against each other and held between two thick plates, in order to prevent any deformation of said plates consisting of fine opaque sheets. This is because one difficulty in the manufacturing of the device is the tendency to the deformation of the fine sheets, which do not have the necessary rigidity and must therefore be placed between thicker supports.

According to one characteristic of the invention, the plates are separated from each other by layers of a transparent lubricating liquid. This is because, in the contrary case, friction between the plates make correct functioning difficult. Another solution is to use plates which do not touch each other, but this solution is difficult since it requires excellent surface evenness of the plates.

Sliding of one plate with respect to another can in general take place along two axes. However, the system is simplified, according to one characteristic of the invention, if this sliding takes place along only one axis. In this case, it is possible to use a guide rail to help maintain correct relative positioning of the plates. However, such a rail is expensive and poses problems of positioning. In order to facilitate the relative positioning of the plates, and according to one characteristic of the invention, two adjacent plates sliding with respect to each other along one axis are positioned with respect to each other by microscopic guide rails. A microscopic rail being fragile, it is preferable, according to one characteristic of the invention, to use several microscopic guide rails. These rails can for example be produced by lithography.

Various solutions can be used for the arrangement of the plates and the distribution of the holes on the plates.

According to one characteristic of the invention, an appropriate solution consists of continuously moving the plates with respect to each other so that this continuous movement results in a continuous modification of the surface of each pinhole in the modifiable set. It is possible for example to use several identical plates and one reference position for which the pinholes in said several plates are exactly superimposed on each other. So that the reduction in size of the pinholes takes place regularly, it is preferable to generate a translation movement of the $i^{th}$ plate in a direction oriented at $$\frac{2\pi}{N}$$

radians in a reference frame common to the N plates constituting the set of pinholes. In the case where N plates are used, the pinholes are preferably polygons with 2N sides, although they can also have other shapes, for example circular. The directions of the translation movement of the plates with respect to each other are then preferably directed along midperpendiculars of the polygons.

According to one characteristic of the invention, the sliding of the plates with respect to each other is obtained by means of an iris diaphragm mechanism. This solution is well adapted to the previous case, where it makes it possible to coordinate the continuous movement of several plates. This iris diaphragm mechanism can, in the case where a rotation of the set of pinholes must be avoided, be supplemented by a supplementary rotation device for compensating for the rotation caused by an iris diaphragm mechanism with a single movable element.

According to one characteristic of the invention, one of the plates is moved by means of a linear positioner along an axis. This solution is preferred when a technique based on discrete movements is used. It may also be necessary to move one of the plates by means of a two-axis positioner. This solution is one which allows the maximum flexibility.

DETAILED DESCRIPTION OF THE INVENTION

First Embodiment

Figure 1:
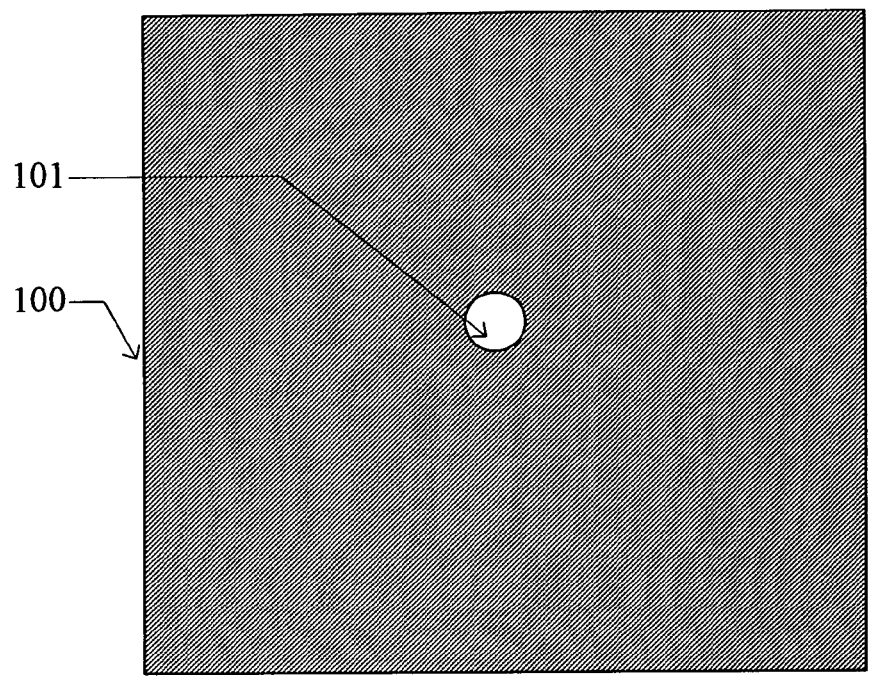
FIG. 1 depicts a plate used in a first embodiment.

This first embodiment makes it possible to obtain square holes of continuously variable size. It uses two identical plates depicted for example by FIG. 1. When the hole 401 in the first plate is exactly superimposed on the hole 401 in the second plate a set of square holes equivalent to the first plate alone is obtained. When the two plates are moved with respect to each other along the axis 402, the size of the square holes resulting from the superimposition of the plates is decreased.

Figure 2:
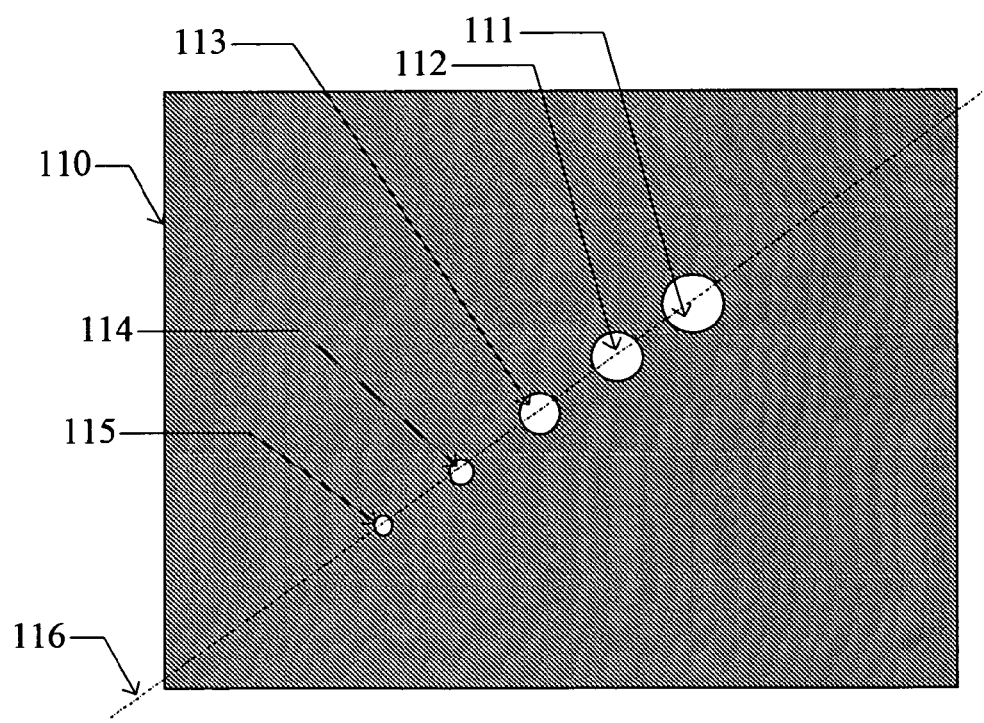
FIG. 2 depicts a device used for preventing leakages of the liquid separating the plates, the device being filled under vacuum.
Figure 3:
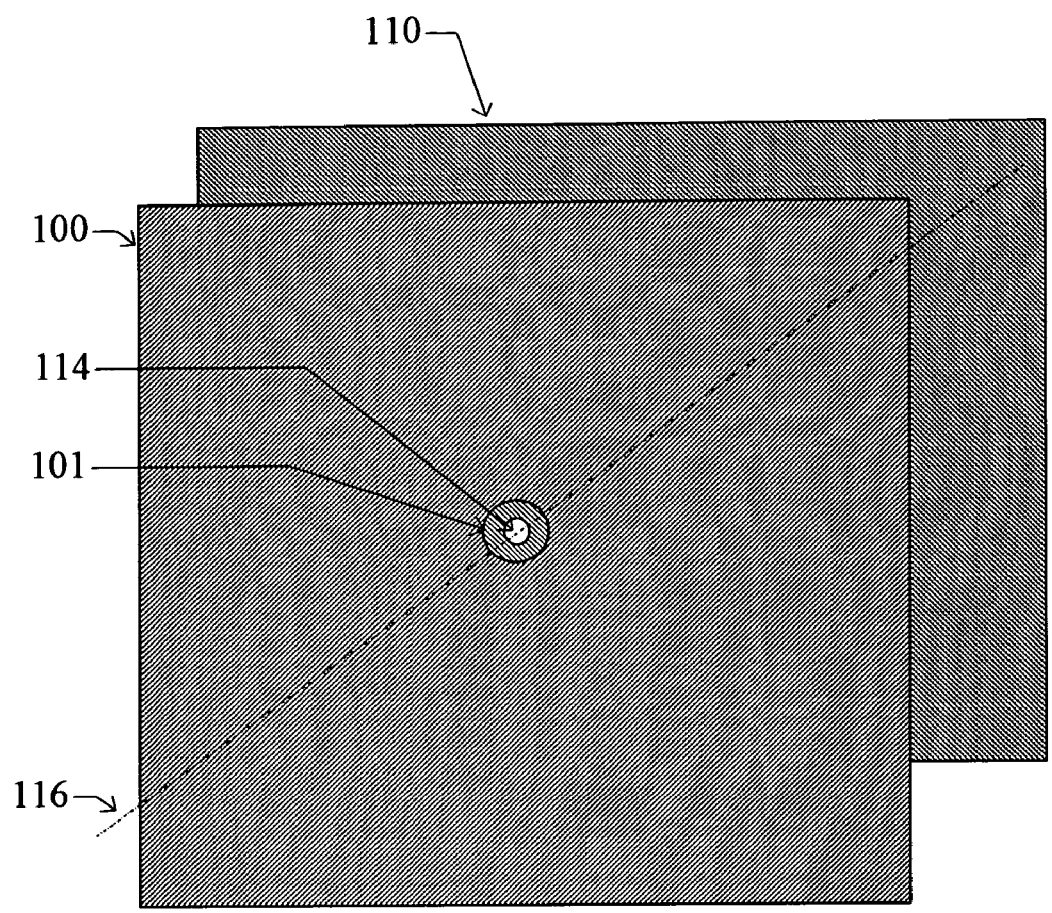
FIG. 3 depicts a similar device but comprising an overflow having a breather.

The two plates moving with respect to each other can be separated by a layer of optical liquid. The system can be made impermeable as indicated in FIG. 2 by means of a flexible closure 500, for example made from plastic, which closes the whole of the system. The liquid can then be injected under vacuum between the two plates and into the area included inside the flexible closure 500. This device makes it possible to reconcile the movement of the plates 110 and 100 with the absence of leakages of liquid. One alternative to filling under vacuum is the overflow system depicted in FIG. 3. A tube 105 leads into a reservoir 502 provided with a breather and raised up and ensures the maintenance of a level of optical liquid in the area included between the plates.

Second Embodiment

This second embodiment is particularly adapted to the case where a high density of pinholes is sought. Although more complicated than the first embodiment, it allows for hexagonal pinholes, which is better than square pinholes. In a basic version, it requires the use of 3 plates which move continuously with respect to each other. They are driven by means of a diaphragm device with modified iris in order to compensate for the rotation of the whole. The pinholes are hexagonal.

Figure 4:
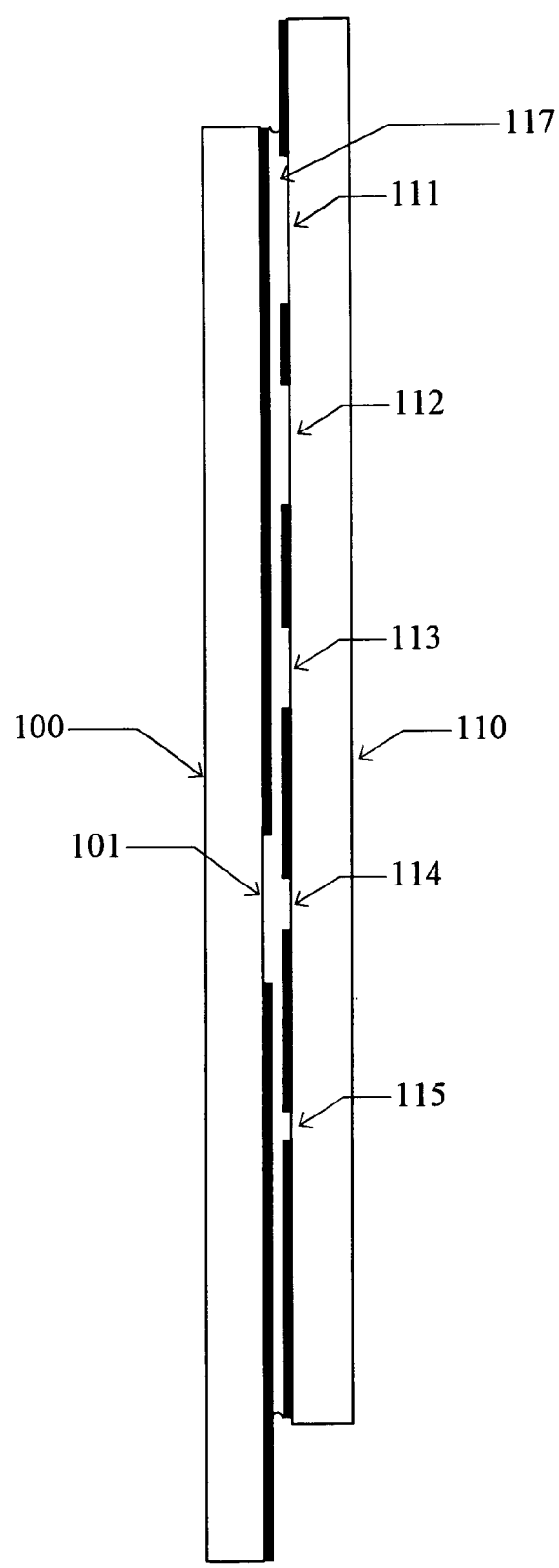
FIG. 4 depicts a plate used in a second embodiment.

The three plates carry arrays of identical holes which, in a reference position, are superimposed on each other. FIG. 4 shows a plate 1000 comprising pinholes, for example 1001. The broken lines, for example 1002, delimit hexagonal locations not carrying any hole. In the reference position, the appearance of the modifiable set of pinholes is the same as the appearance of each of the plates and is therefore depicted by FIG. 4.

Figure 5:
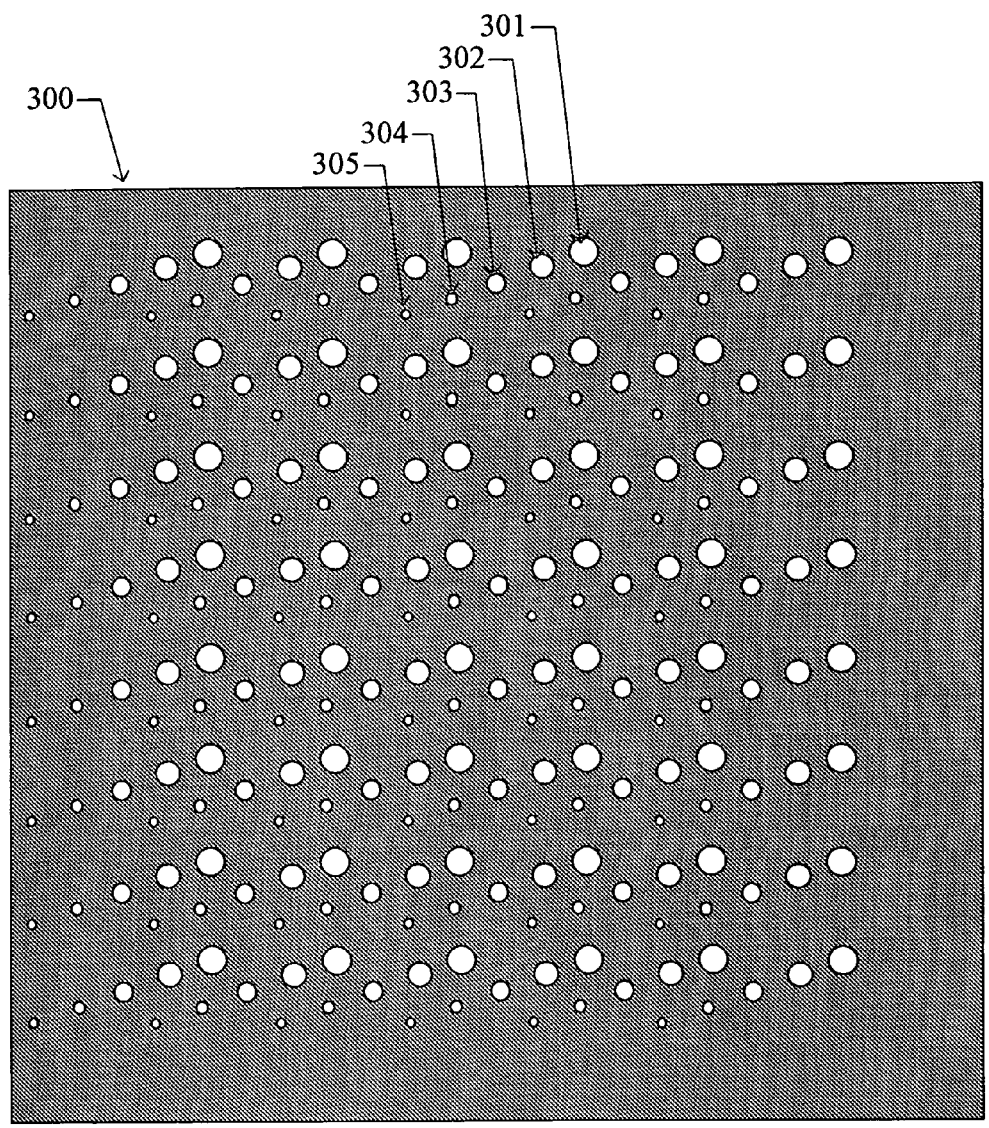
FIG. 5 illustrates the movement of 3 plates in this embodiment.

The size of the holes in the modifiable set of pinholes is modified by moving the plates with respect to each other in the manner indicated by FIG. 5. This figure depicts part of the array of pinholes. In the figure, the broken lines depict the limits of the pinholes in each of the three plates and the intersection of these holes, which constitutes the effective hole of the modifiable array, has been depicted in white. The arrows show the direction of movement of the plates from the reference position. By moving the plates in the direction of the arrows the width of the holes is decreased continuously. The shape of the holes of the modifiable set of pinholes is not modified when their width decreases. This is due to the fact that there are 3 plates, that the holes have 2×3=6 sides, and that the directions of the movement are along the midperpendiculars of the hexagons.

Figure 6:
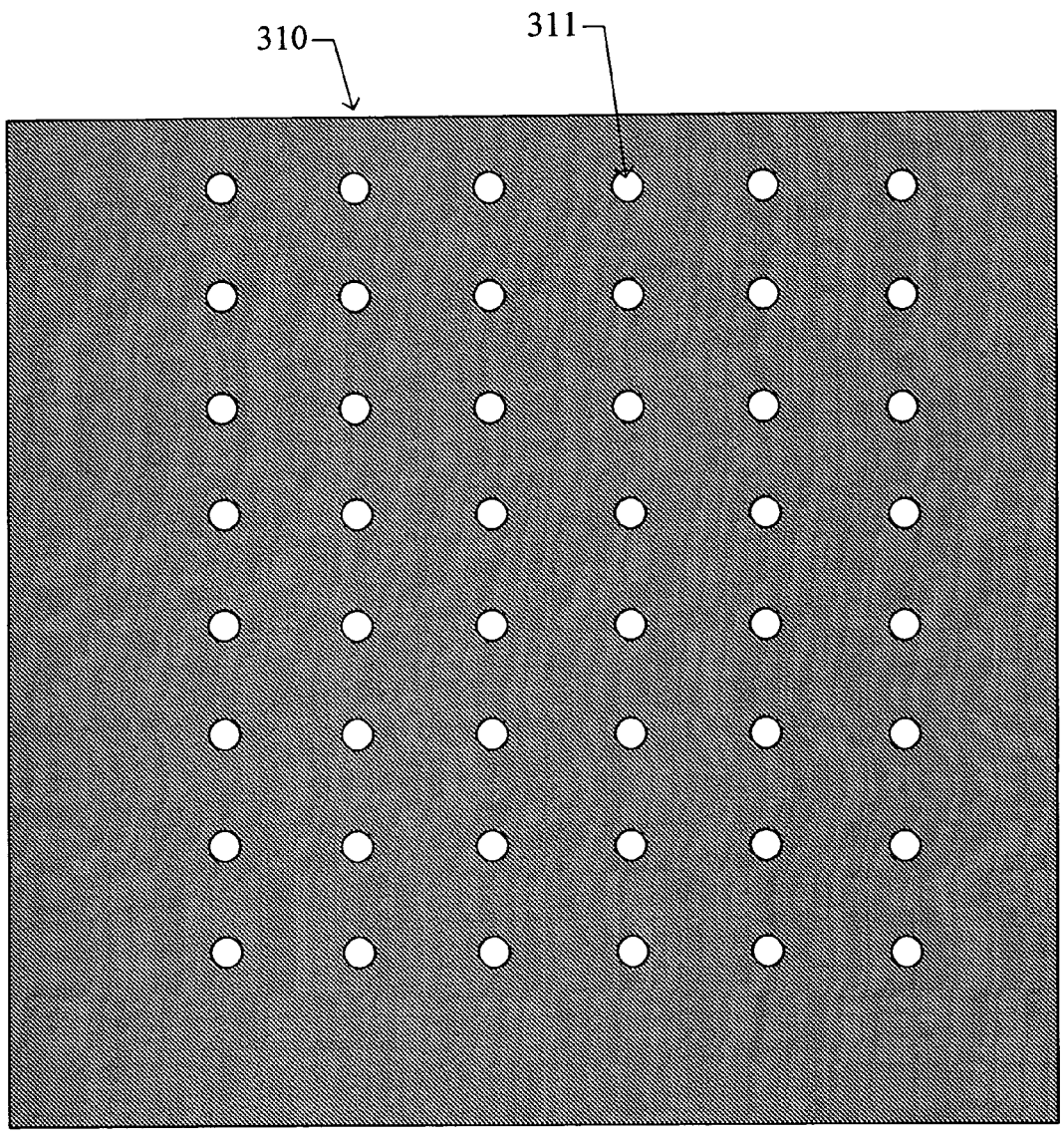
FIG. 6 shows a supplementary plate used in this embodiment.
Figure 13:
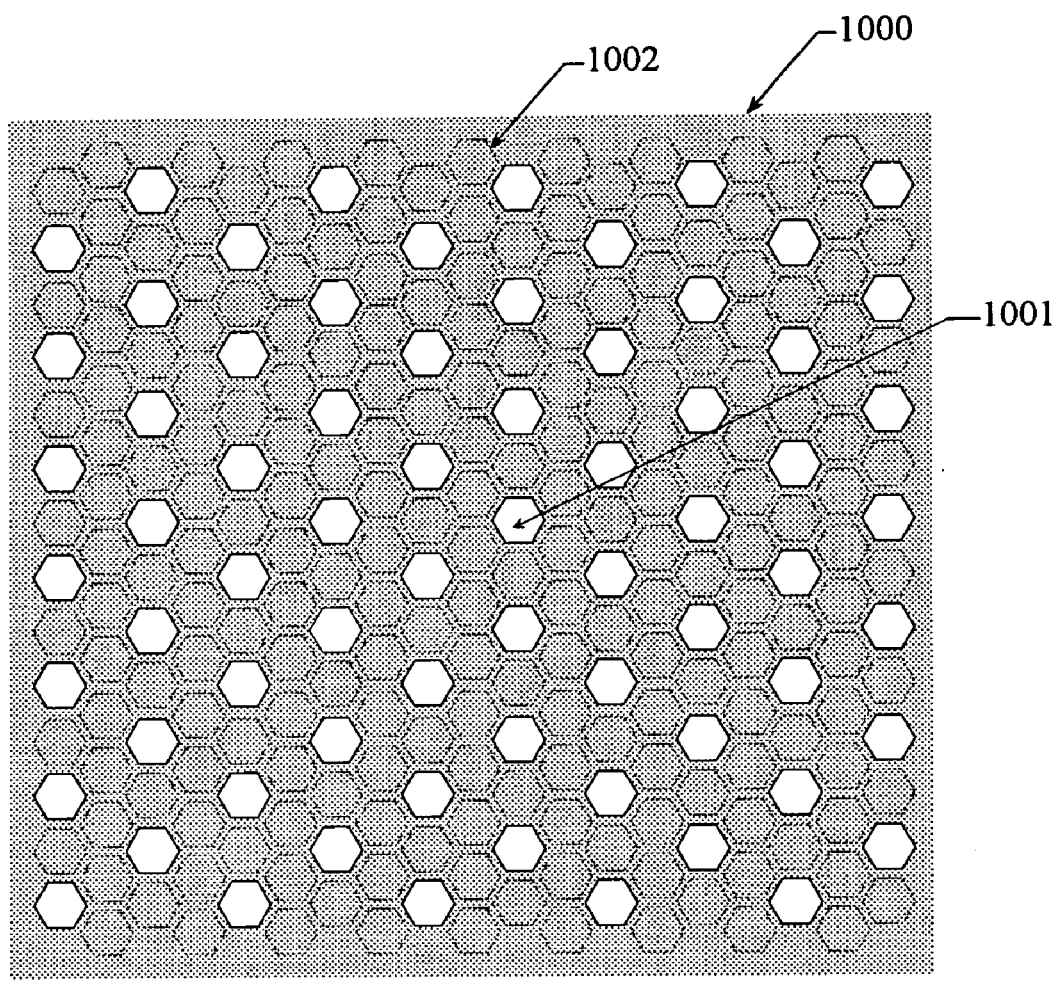

In a version also making it possible to modify the density of pinholes, a fourth plate is necessary. This plate is depicted in FIG. 6. The set of modifiable pinholes obtained by means of three plates and depicted in FIG. 4 in the reference position constitutes a first intermediate set. The plate in FIG. 5 constitutes a second intermediate set. When the hole 1010 in the plate in FIG. 6 is superimposed on the hole 1001 in the first intermediate set in FIG. 4, the density of pinholes is at a maximum. When the hole 1013 in the plate in FIG. 6 is superimposed on the hole 1001 in the first intermediate set in FIG. 4, the number of pinholes per unit surface area is divided by 4. When the hole 1012 in the plate in FIG. 6 is superimposed on the hole 1001 in the first intermediate set in FIG. 4, the number of pinholes per unit surface area is divided by 9. When the hole 1011 in the plate in FIG. 6 is superimposed on the hole 1001 in the first intermediate set in FIG. 13, the number of pinholes per unit surface area is divided by 16.

Figure 7:
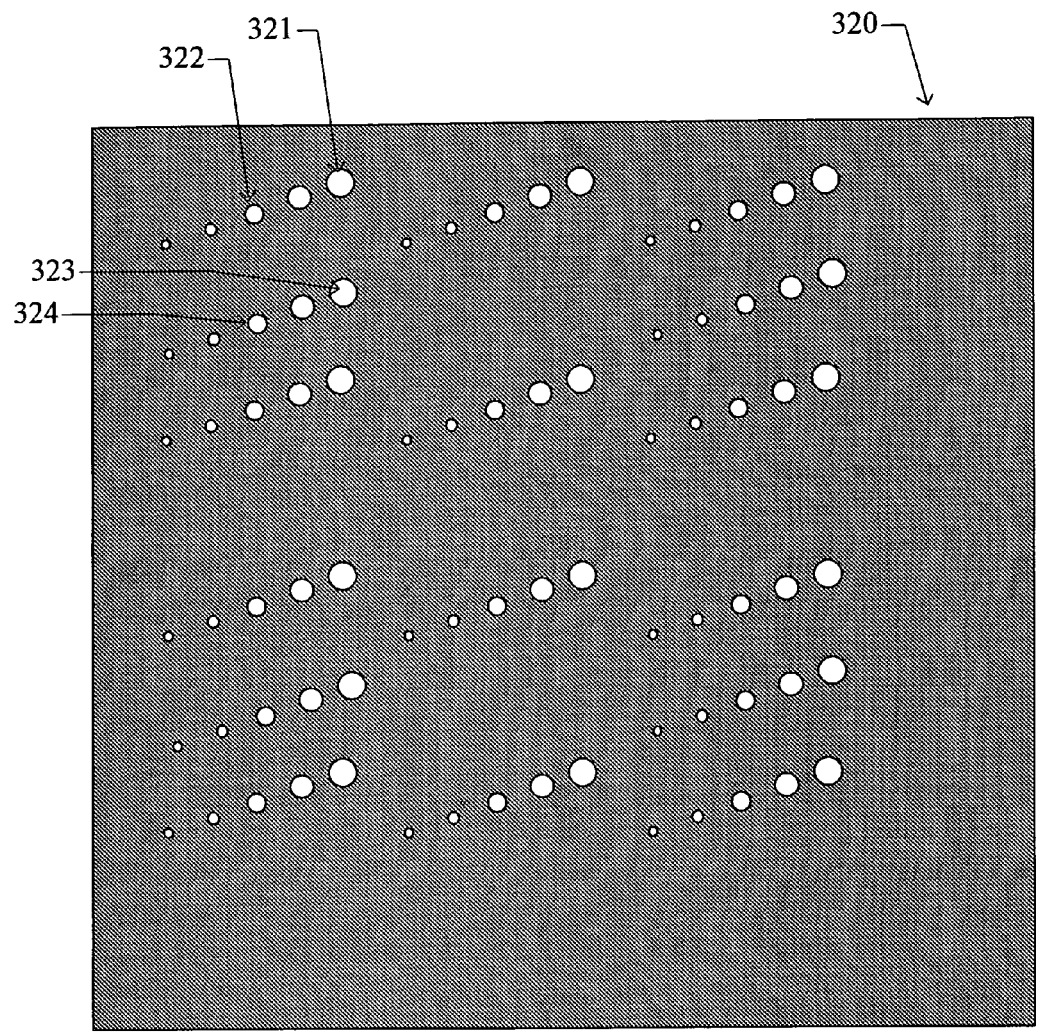
FIG. 7 shows in front view the device driving 3 identical plates on the principle of FIG. 5.
Figure 8:
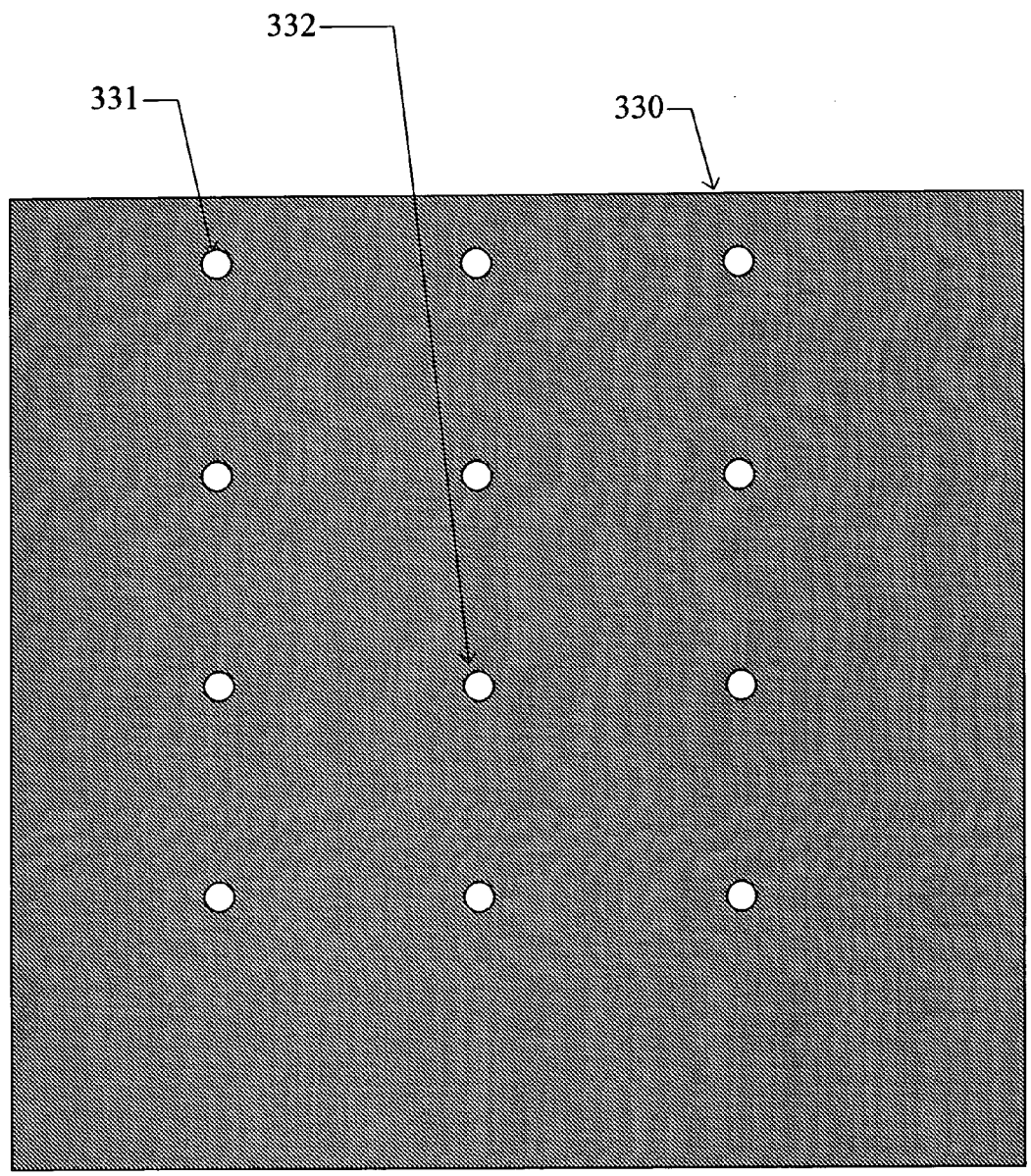
FIG. 8 shows this device in section, supplemented by a fourth plate.

The three identical plates depicted in FIG. 4 can be driven by means of an iris diaphragm drive system depicted in FIGS. 7 and 8. The plates in FIG. 4 are the plates 1040, 1041, 1042 depicted in FIG. 8. These plates are metallic sheets tensioned over circular holding rings 1022, 1021, 1020 and carrying holes produced for example by laser piercing. These three fixing rings are connected to two control rings 1023, 1024. For example, the internal ring 1020 is connected to the control ring 1023 by a bar 1028 turning freely about an axis 1029 fixed in the control ring 1023. The internal ring 1020 is connected to the control ring 1024 by a bar 1026 turning freely about an axis 1027 fixed in the control ring 1024. The housing 1031 of the axis 1027 is oversized so as to be able to combine a rotation and translation with respect to the axis 1027. A tie rod 1030 is used for keeping the housing 1031 in abutment on the axis 1027. The other two holding rings are connected in a similar manner to the control rings. When the two control rings turn simultaneously in opposite directions and by an equal angle, the three plates move in translation with an angle of 120 degrees between the directions of each movement axis, as indicted in FIG. 5.

FIG. 8 also depicts the fourth plate 1051 which is a sheet tensioned on a holding ring 1050. The holding ring 1050 is mounted on a two-axis positioner.

The plates 1051 and 1042 are themselves pressed on thick plates of glass 1052 and 1043. When the whole of the system is in position the two glass plates 1052 and 1043 prevent deformations of the sheets (plates) 1042, 1041, 1040, 1051 carrying pinholes.

Method of Guiding and Positioning the Plates

The plates carrying pinholes move in translation with respect to each other along a single axis. For example, in the first embodiment, and also in the second embodiment with regard to the three plates moving by means of an iris diaphragm mechanism. This solution simplifies the system in that each plate moves with respect to another along a single axis. As indicated above a guide rail can be used for guiding the plates However, a macroscopic guide rail is difficult to produce with the required precision. In order to obtain good positioning of the plates it is possible to replace such a guide rail with a set of microscopic guide rails. General principles of a guidance method descrbied in U.S. patent application No. 7,088,487 column 6 lines 1 to 44.

Figure 9:
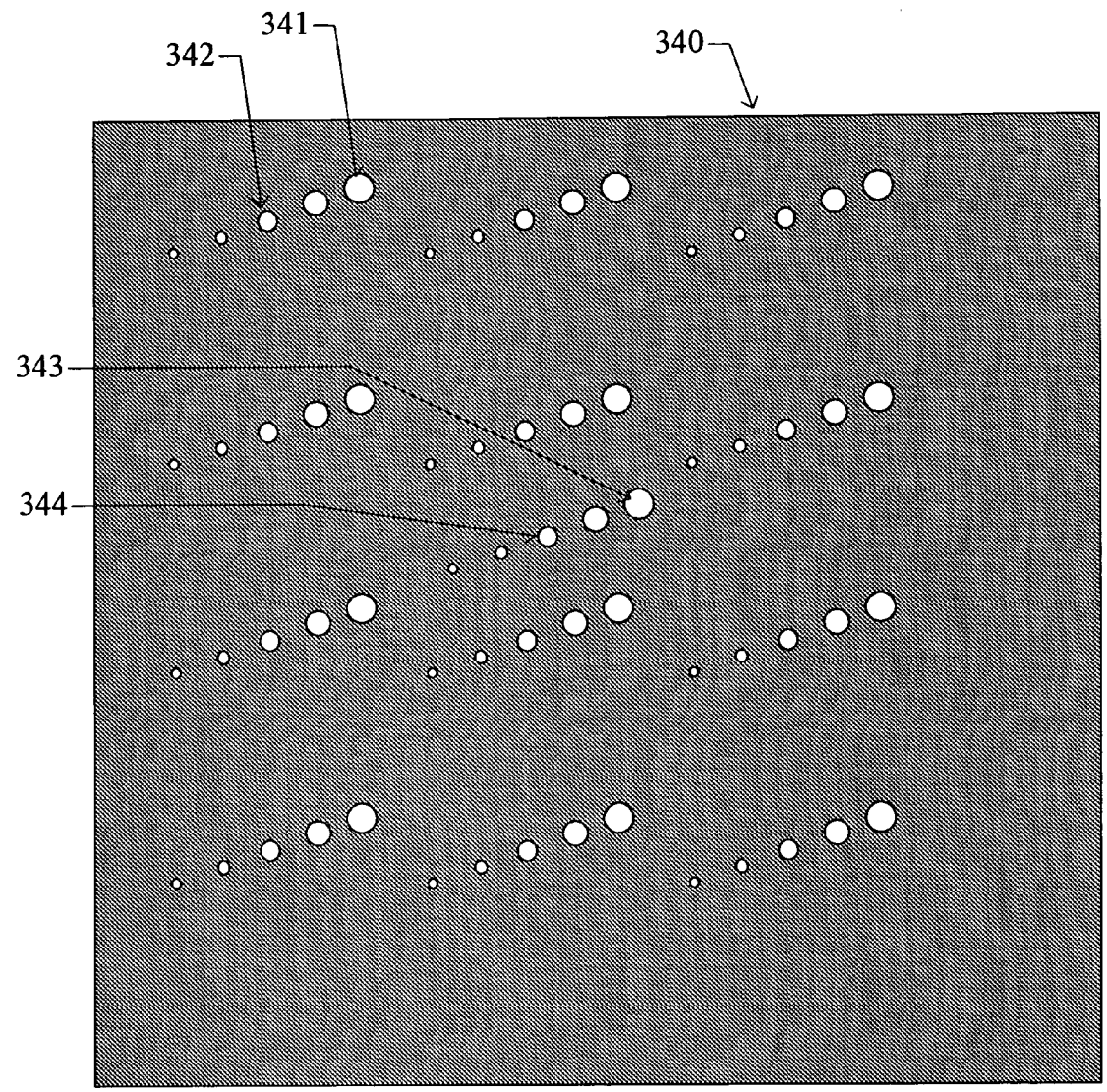
FIG. 9 depicts in section the assembly of two plates produced on metallic sheets.
Figure 10:
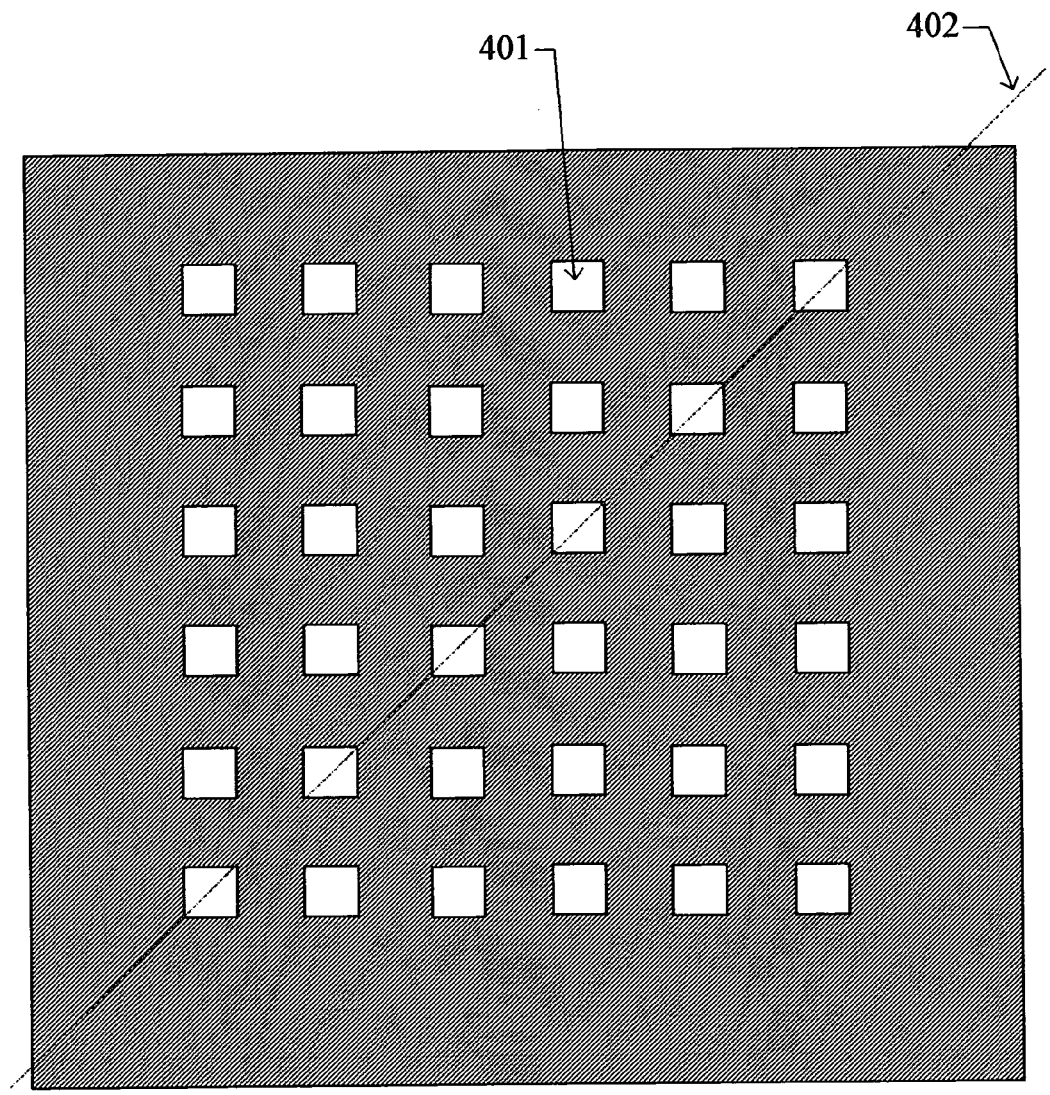
Figure 11:
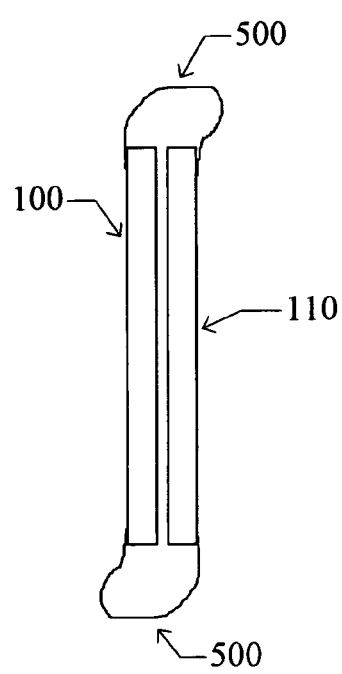
Figure 12:
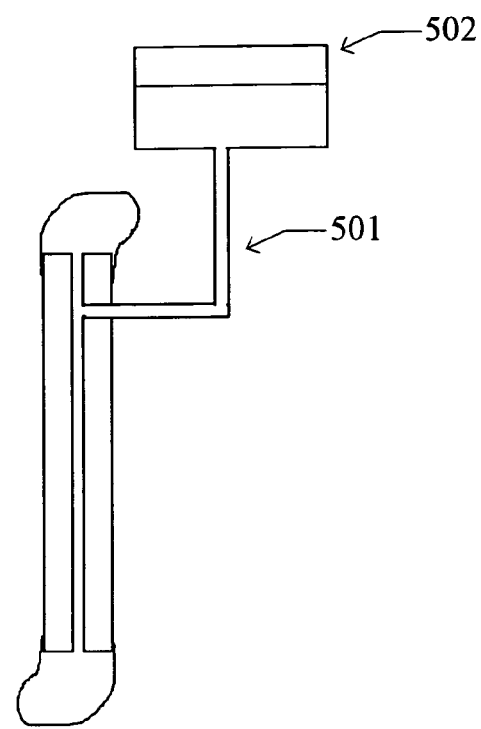
Figure 14:
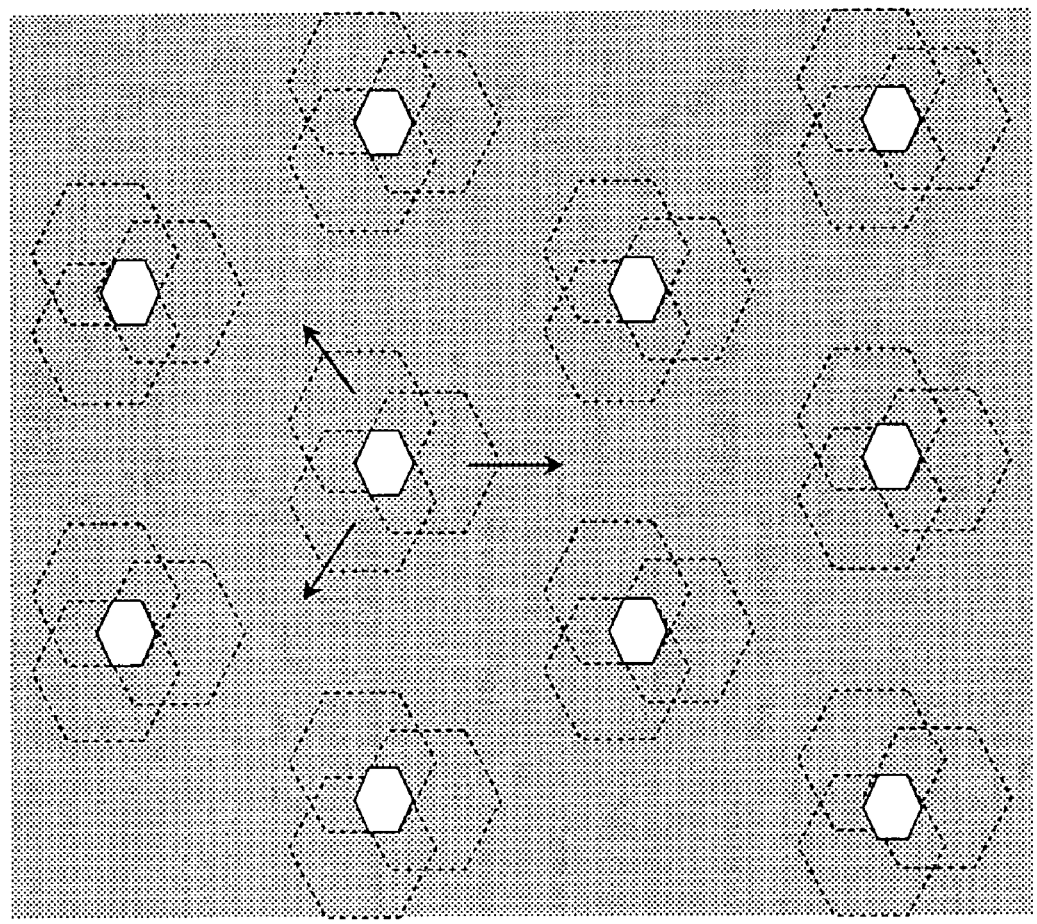
Figure 15:
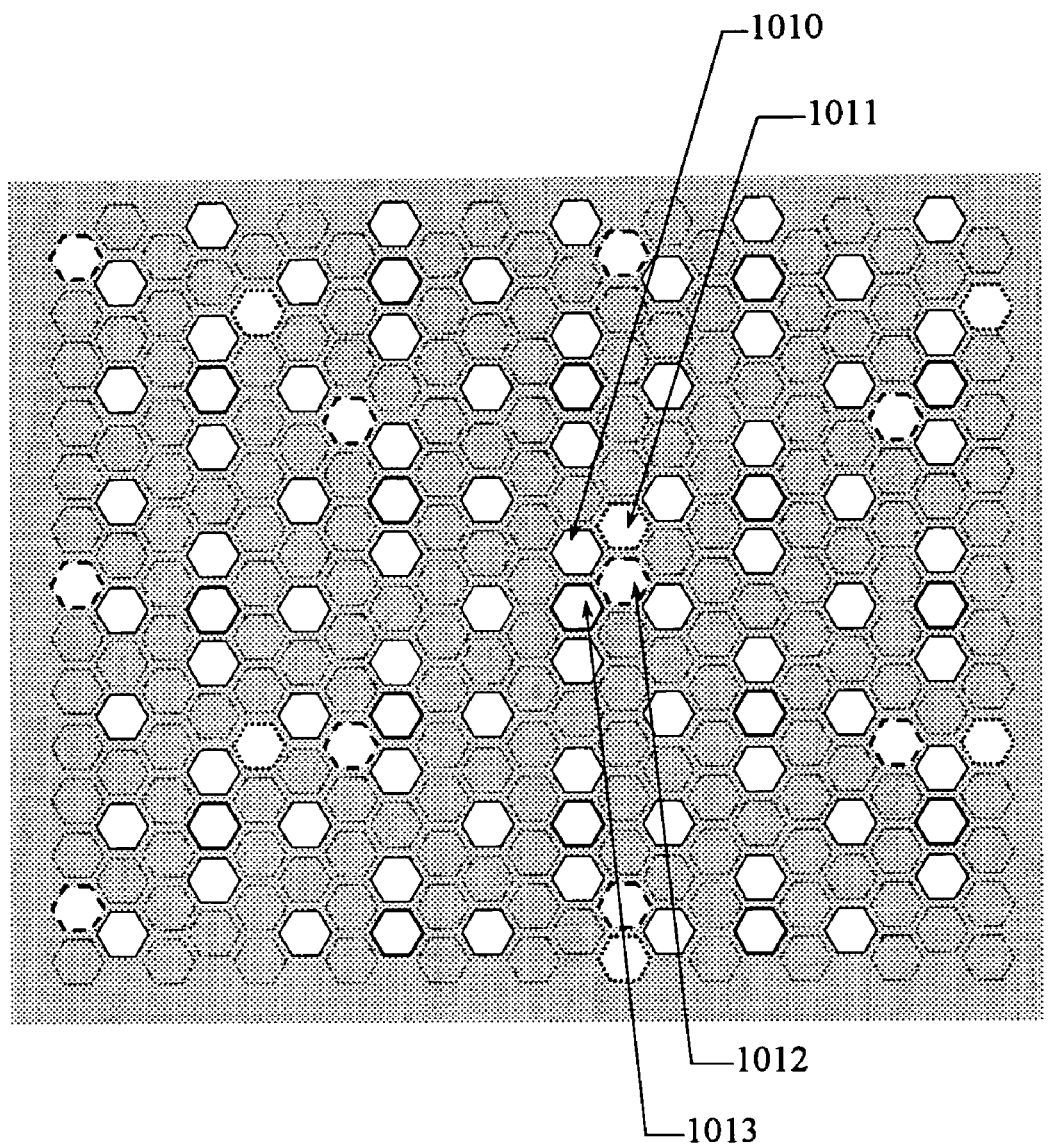
Figure 16:
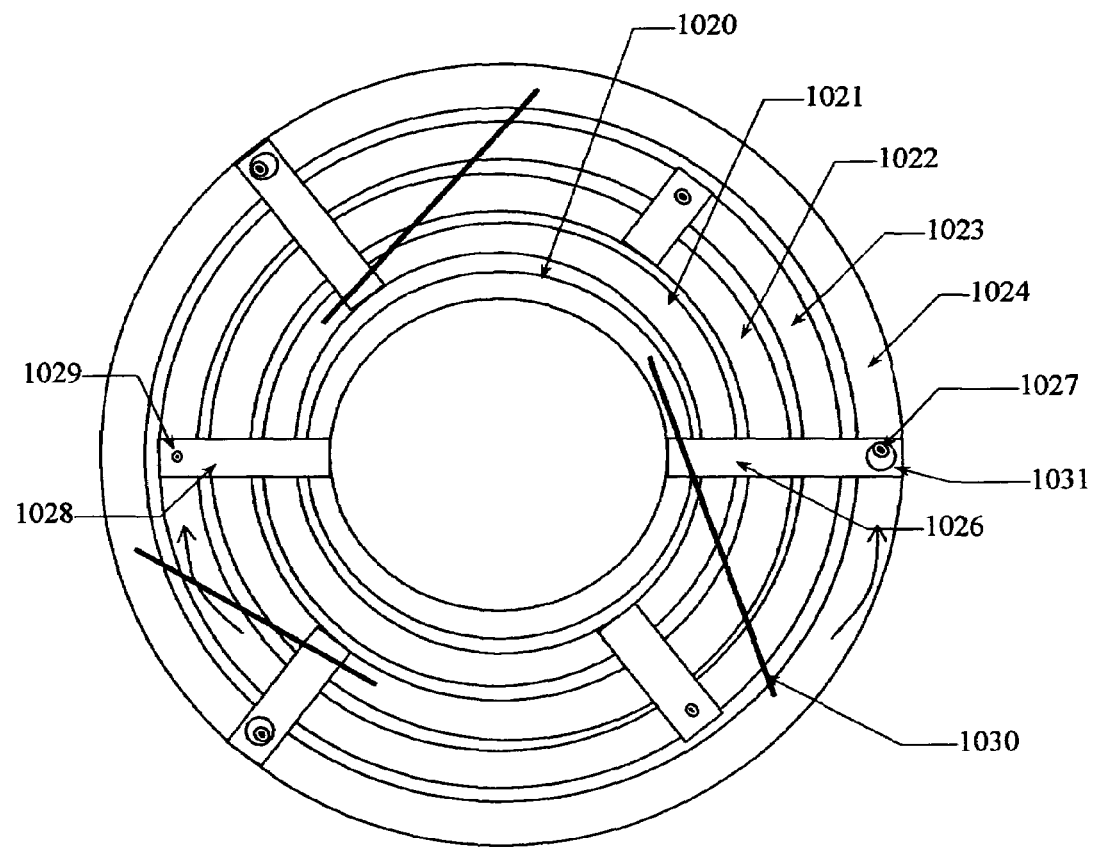
Figure 17:
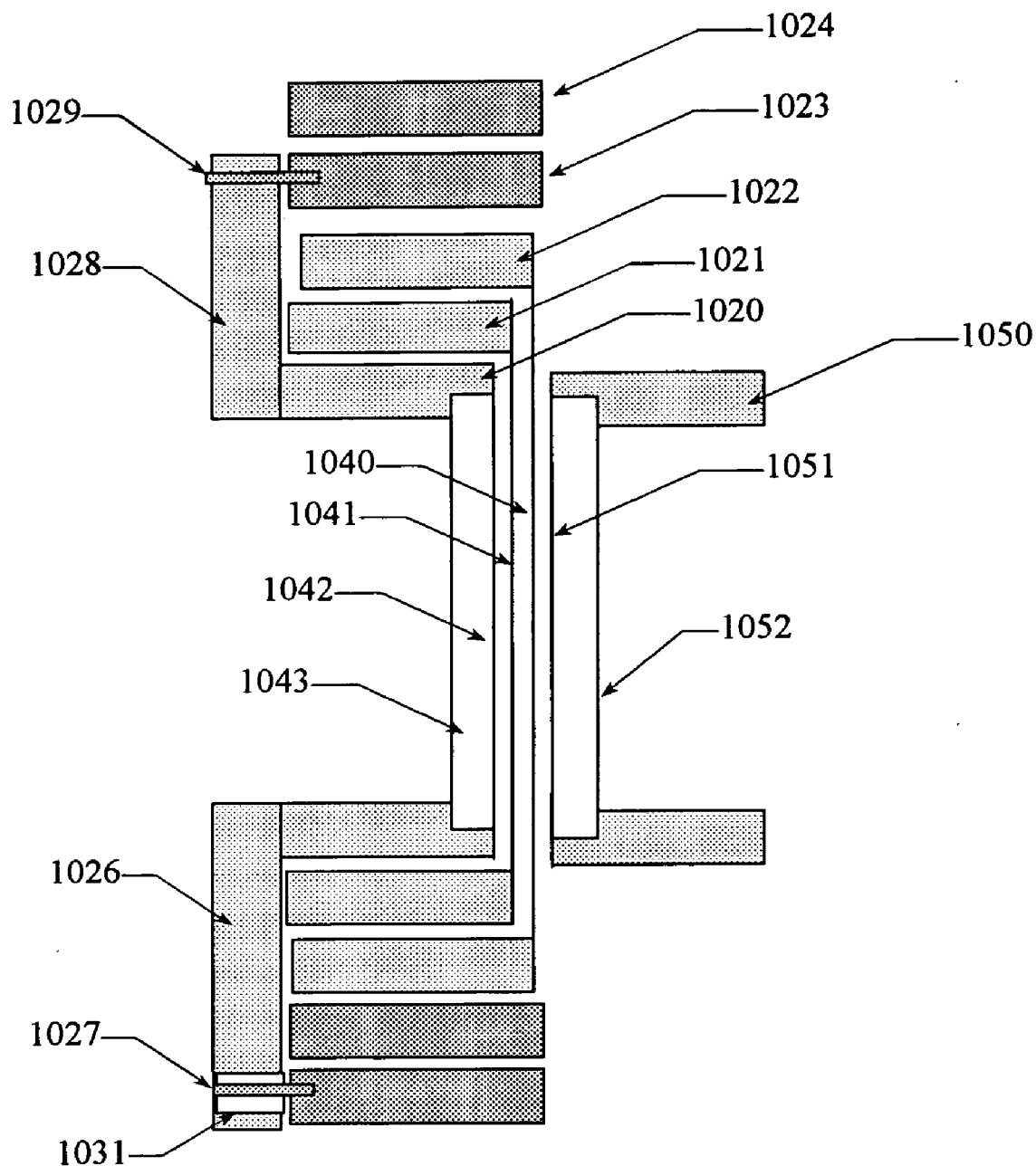
Figure 18:
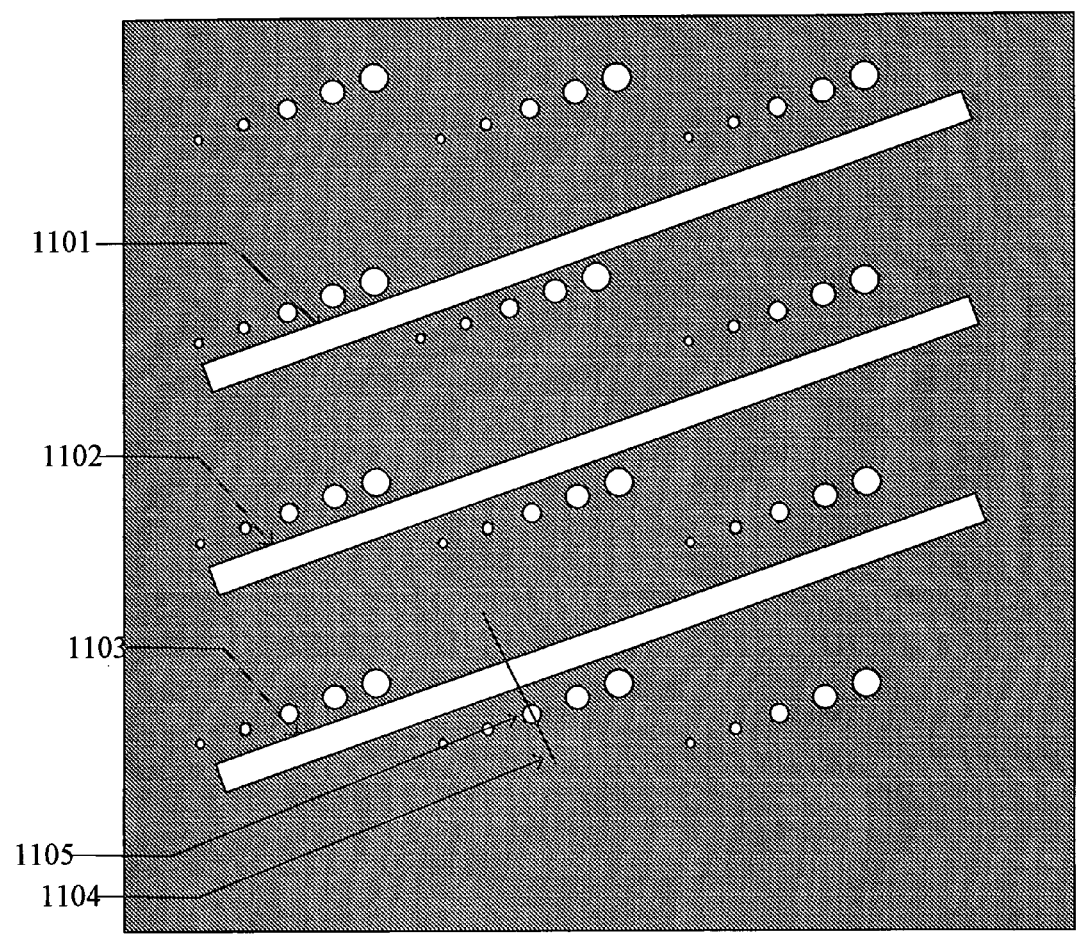
Figure 19:
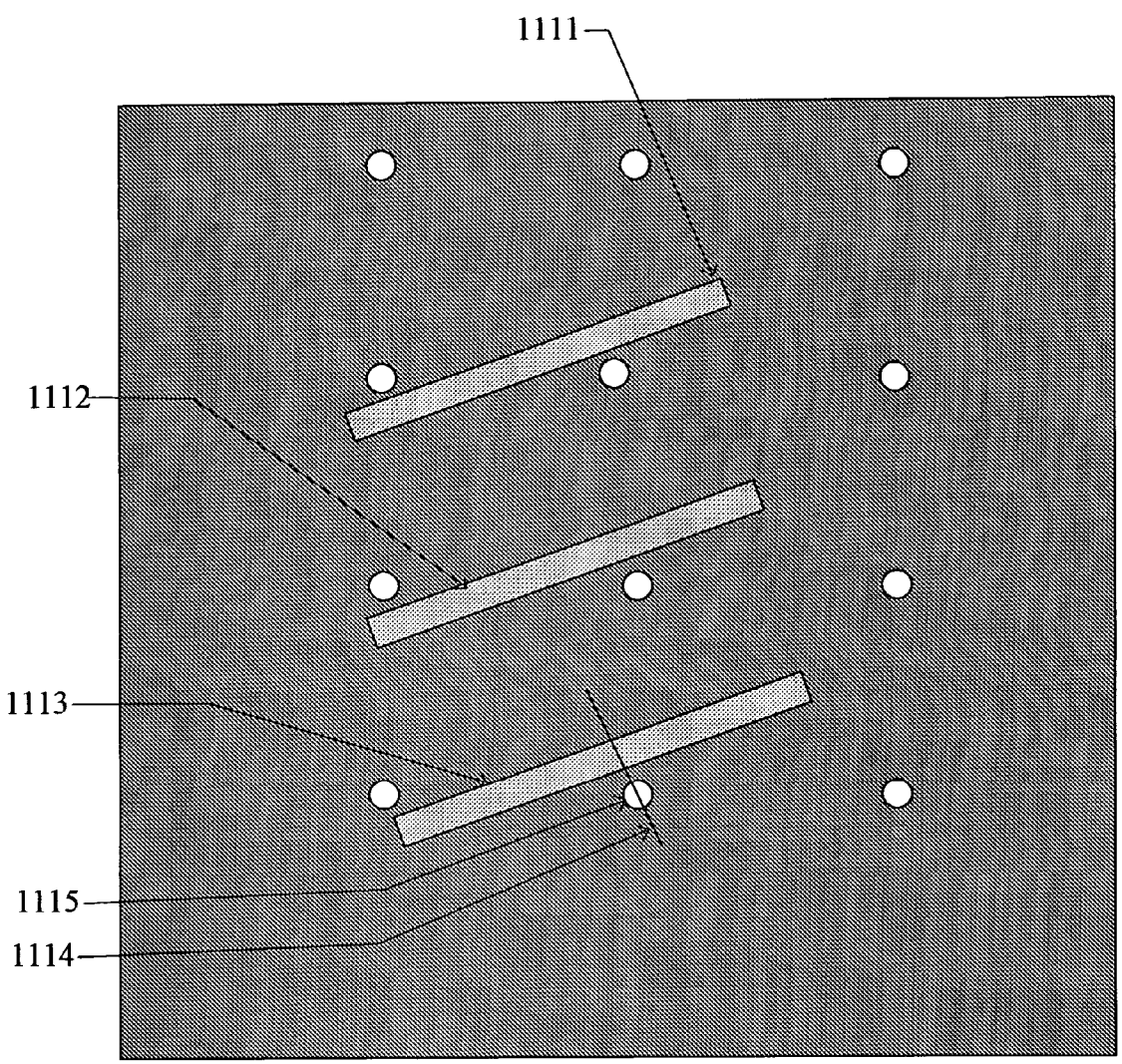
Figure 20:
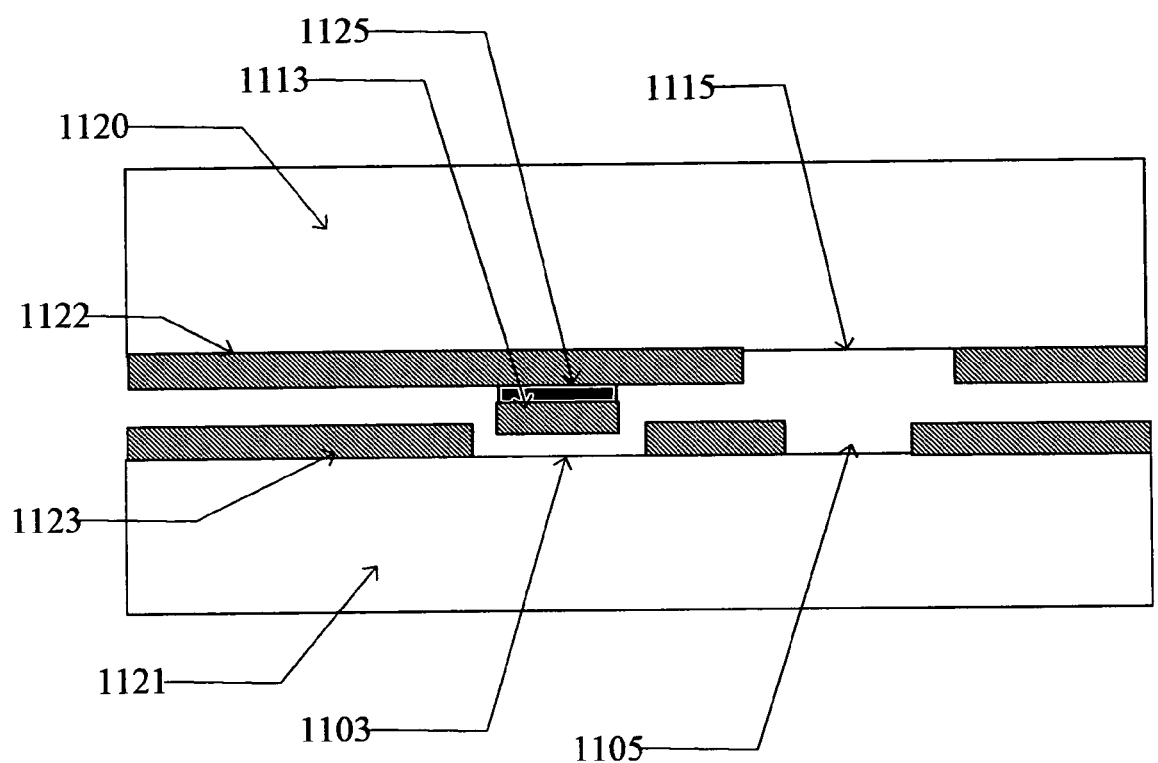
Figure 21:
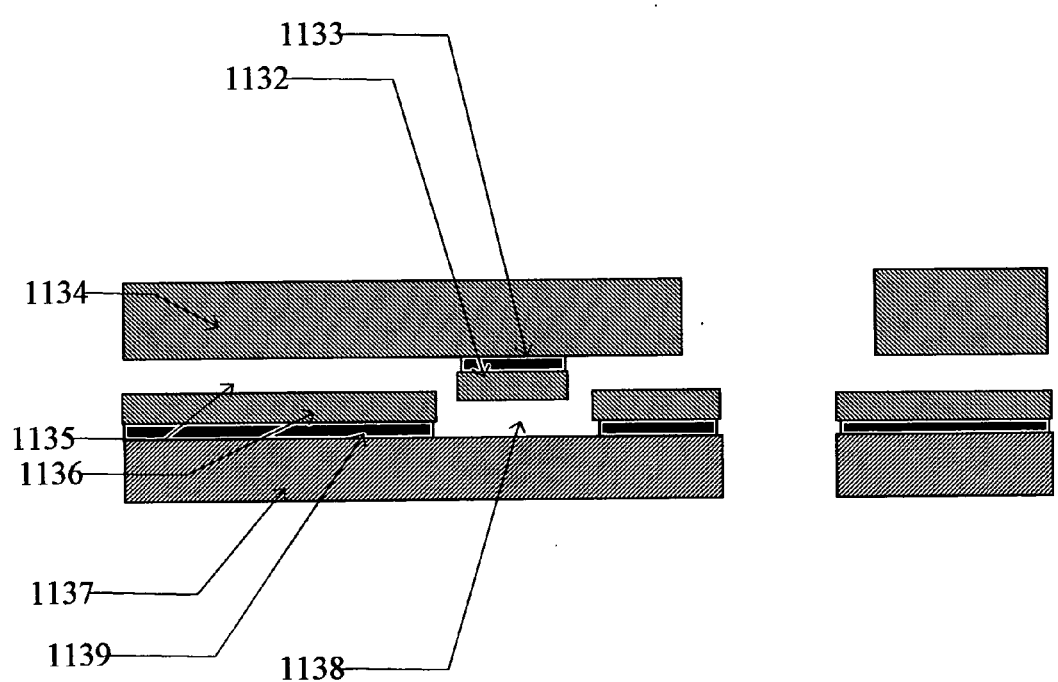

This guidance method can be adapted to the case where the plates are metallic sheets, as in the second embodiment. In this case male or female rails can be produced on each side of each sheet. The glass plates are then replaced by the metallic sheets. The diagram in FIG. 9 is equivalent to that in FIG. 14 of U.S. Pat. No. 7,088,487 but illustrates the case of plates formed by fine metallic sheets. The plate 1134 carries the male rail 1132 separated from the plate by a layer of protective resin 1133 used for producing the rail 1132 by lithography. The plate 1137 carries the female rail 1138 produced by lithography in a metallic layer 1135 separated from the plate by a resin 1139. The space between the two plates is filled with a lubricanting liquid. A guide rail has been shown only on one side of each plate but it is possible to produce one on each side of each plate. In the case of the second embodiment, the guide rails which separate each metallic sheet guided by two adjacent sheets participate in the maintenance of the shape of the metallic sheets and in the prevention of deformations. Naturally sheet number 1051 in FIG. 8 can be guided by this method only if its movement is restricted to a single direction.

INDUSTRIAL APPLICATIONS

The present set of pinholes can be used in a confocal microscope with multipoint illumination. For example, if a set of pinholes of the type described in the first embodiment replaces the set of pinholes used in the system described by FIG. 1 of U.S. Pat. No. 5,239,178 it becomes possible to modify the size of these pinholes. Likewise, the array of pinholes in the first embodiment of the present invention can replace, with the same effect, the array of pinholes used in FIG. 3 of the U.S. Pat. No. 5,978,095. By using a modifiable array of pinholes according to the present invention in the microscope described by one of the first two embodiments of French patent application number 0103860 of 22 Mar. 2001, it is possible to easily modify the diameter of the pinholes, which affects the speed/resolution or speed/penetration depth compromise in the sample.

What is claimed is:

1. A modifiable array comprising a plurality of microscopic apertures and adapted to filter a light beam in a confocal microscope,
   comprising a plurality of plates each of which comprises a plurality of intermediate apertures,
   wherein each microscopic aperture results from the superimposition of intermediate apertures in each of said plates,
   wherein each of said intermediate apertures contributes to the formation of at most one microscopic aperture,
   at least one of said plates being adapted to move, to switch from a first configuration to a second configuration,
   wherein the size of the microscopic apertures in said second configuration differs from the size of the microscopic apertures in said first configuration, and
   wherein each microscopic aperture is made up of the superimposition of the same intermediate apertures in the second configuration as in the first configuration, comprising exactly three movable plates, each microscopic aperture being hexagonal.

2. The modifiable array of claim 1, further comprising an iris diaphragm adapted to move the plates.

3. The modifiable array of claim 1, the plates being separated from each other by a layer (117) of a transparent lubricating liquid.

4. A modifiable array as claimed in claim 1, wherein at least one of the plates is a thin sheet carrying intermediate apertures, and wherein said at least one thin sheet is placed between two thick plates, to avoid a deformation of the sheet.

5. The modifiable array of claim 4, the plates being separated from each other by a layer (117) of a transparent lubricating liquid.

6. A modifiable array comprising a plurality of microscopic apertures and adapted to filter a light beam in a confocal microscope, comprising a plurality of plates each of which comprises a plurality of intermediate apertures, wherein each microscopic aperture results from the superimposition of intermediate apertures in each of said plates, wherein each of said intermediate apertures contributes to the formation of at most one microscopic aperture, at least one of said plates being adapted to move, to switch from a first configuration to a second configuration, wherein the size of the microscopic apertures in said second configuration differs from the size of the microscopic apertures in said first configuration, and wherein each microscopic aperture is made up of the superimposition of the same intermediate apertures in the second configuration as in the first configuration, the plates being separated from each other by a layer (117) of a transparent lubricating liquid.

7. The modifiable array of claim 6, wherein at least one of the plates is a thin sheet carrying intermediate apertures, and wherein said at least one thin sheet is placed between two thick plates, to avoid a deformation of the sheet.

8. The modifiable array of claim 6, comprising exactly three movable plates, each microscopic aperture being hexagonal.

9. The modifiable array of claim 6, the movement of each plate relative to another being along one axis only.

10. The modifiable array of claim 9, the plates being positioned with respect to each other by means of microscopic guide rails.

11. The modifiable array of claim 10, at least one of the microscopic guide rails being manufactured on one of the plates using a lithographic method.

* * * * *